UNITED STATES PATENT OFFICE.

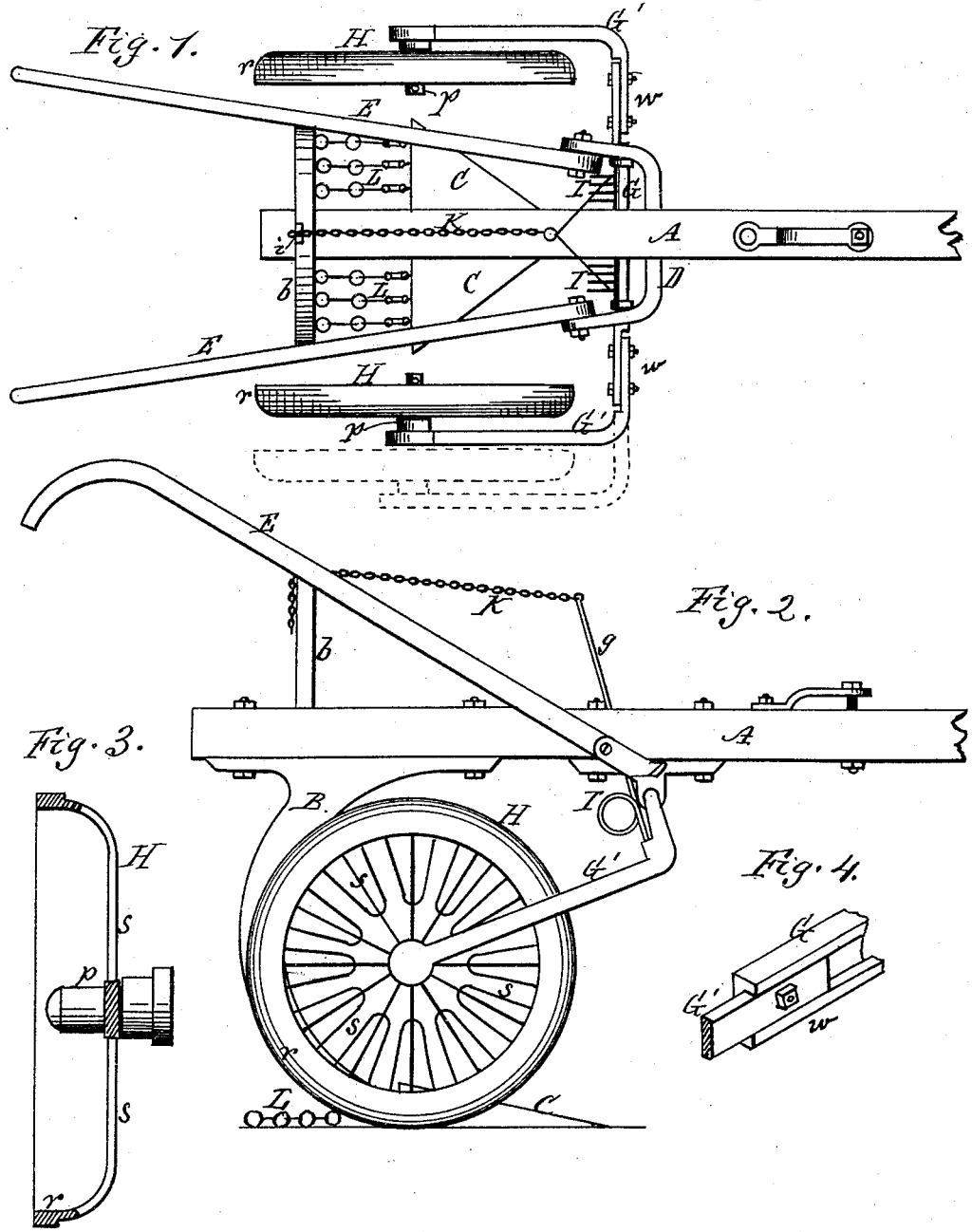

WILLIAM D. ROBINSON, OF KANONA, NEW YORK.

POTATO-DIGGER.

SPECIFICATION forming part of Letters Patent No. 342,227, dated May 18, 1886.

Application filed October 17, 1884. Serial No. 145,801. (No model.)

*To all whom it may concern:*

Be it known that I, WILLIAM D. ROBINSON, of Kanona, in the county of Steuben and State of New York, have invented a certain new and useful Improvement in Potato-Diggers; and I do hereby declare that the following is a full, clear, and exact description of the same, reference being had to the accompanying drawings, in which—

Figure 1 is a plan of a potato-digger, showing my improvement. Fig. 2 is a side elevation of the same. Figs. 3 and 4 are detail views.

My improvement relates to potato-diggers, and in general construction the machine is similar to that on which I have a pending application for patent, filed February 20, 1884.

My present invention consists in the construction and arrangement of the machine, as hereinafter described, whereby a better separation of the potatoes from the dirt is effected, clogging by the vines is prevented, and the machine is gaged to different widths, all as will be more fully set forth.

In general construction the machine is similar to that before referred to embodied in my pending application for patent.

A is the beam.

B is a standard in the rear, to which is attached the opening point or plow C.

D is a casting or frame, to which the axle is attached, said casting being bolted to the under side of the beam.

E E are the handles.

G G' G' is the axle, and H H are the wheels.

I is a spring connected with the axle in such a manner that it serves as a lever to adjust the axle higher or lower, and also as an elastic cushion between the beam and the wheels, as described in my before-mentioned invention.

K is a chain, cord, or other connection, attached at one end to the lever $g$ of the spring, the other end extending back and catching in a bearing or notch, $i$, in a standard, $b$, at the rear, by which the axle can be held up at any adjustment.

L L are chains attached to the rear of the opening-point C, as described in my prior application for patent.

My present improvement is as follows: The axle is made to turn in the bearing D, and as the ends G' G' of the axle are cranked it will be seen that the wheels attached thereto will be raised or lowered as the axle is turned. By this means the plow may be made to cut deeper or shallower, as necessity requires. The wheels are held at any adjustment by means of the chain K aforesaid.

In my former invention aforesaid the ends of the cranks are turned outward, and the wheels are located outside the cranks. In such case there is more or less liability to clog, as the vines and weeds carried up by the wheel will catch and wind upon the bent end or journal of the crank.

In my present invention I reverse the position of the wheels by setting them inside the cranks, as shown in Fig. 1, the arm of the crank coming entirely outside of the wheel, and a short axle or journal, $p$, being used, projecting inward, on which the wheel rests. By this means there is no danger of the catching and winding of vines and weeds on the journal, as all vines and weeds lie inside the wheel, and if carried up to the top they are also carried over without coming in contact with any body on which they can wind. This obviates a great difficulty in potato-diggers of this class.

Each of the wheels H consists of a rim, $r$, which is concave in cross-section, the inner edge being carried in horizontally far enough to form a flange or tread to run on the surface of the ground, and the concave or hollow of the wheel being on the inside next the row of potatoes which is being dug. The wheel is provided with numerous spokes, $s s s$, which extend down from the hub in line with the face of the wheel, and curved at the outer extremities, conforming to the concave at the tread portion. These spokes are placed so near together that they prevent the passage of the potatoes from the inside to the outside, but allow the free passage of the dirt, thus forming, in fact, a sifter. The potatoes will be retained and left in a row in the center, while such dirt as strikes the wheel sifts freely through. The spokes may be arranged in any desired way; but the plan shown in Fig. 2 is preferable, in which straight spokes extend from the hub to the rim and short auxiliary spokes connect with the straight spokes, filling the spaces at the outer part of the wheel. By this means a very effective separation of the potatoes from the dirt is attained. By this construction there will be but little tendency of the weeds and vines to be carried up by the wheel; but such as are carried up will be thrown over without winding or catching on the journal, by reason of locating the wheels inside the cranks, as before described.

The axle is made in three separate parts, G G' G', instead of in one piece, as in my former invention. The center portion, G, is straight and turns in the bearing D, and its ends project somewhat beyond the sides of the bearing. The parts G' G' are curved, as shown, and form the cranks for the wheels. The ends next the straight length G are made straight, however, and lap past the ends of the straight length, thus forming a joint, w, which is bolted or otherwise attached together, as shown in Fig. 1. By this means lateral or outward adjustment is allowed to lengthen the axle, and thus spread the wheels further apart, which is desirable in the use of the machine where the rows are planted at different distances apart in different soils. In the joint shown one of the straight ends is flanged at opposite edges, and the other length runs between the flanges and is secured by a bolt; but any other arrangement can be used, if desired, to fasten the parts together.

If desired, the short journal p, upon which the wheel rests, may be so arranged as to be adjustable for the purpose of giving any desired pitch or dip to the wheel from a vertical line, which is sometimes necessary.

It will be seen from the above construction that the wheels H H by their rotation and by the closeness of the spokes, serve as sifters to sift the dirt from the potatoes, leaving the latter in a row behind.

Having described my invention, I claim—

1. In combination with the digger, an arch or yoke over the digger, wheels pivoted to the inner side of the feet of the arch or yoke, and riddles on said wheels.

2. In combination with the digger and an arch over the digger, combined carrying and riddling wheels pivoted on the inner sides of the feet of the arch, and having spokes inclined from the hub toward the digger.

3. In a potato-digger, the combination, with the frame, of an axle turning in bearings of the frame and having cranked ends, a spring connected with the axle, serving as a cushion and as a gage to adjust the height of the opening-point, and wheels attached to the cranked ends of the axle and on the inner sides thereof, as shown and described, and for the purpose specified.

4. In a potato digger, the combination, with the frame, of a cranked axle resting in bearings of the frame, and made in parts provided with a slip joint, whereby it may be lengthened and shortened, and supporting-wheels made open and spoked to form sifters attached to the cranked ends and resting inside the cranks, as shown and described, and for the purpose specified.

In witness whereof I have hereunto signed my name in the presence of two subscribing witnesses.

WILLIAM D. ROBINSON.

Witnesses:
R. F. OSGOOD,
Z. L. DAVIS.